(12) United States Patent
Charters

(10) Patent No.: US 8,141,837 B2
(45) Date of Patent: Mar. 27, 2012

(54) VEHICLE SUPPORT APPARATUS

(75) Inventor: Brion S Charters, Clarence, NY (US)

(73) Assignee: BBX Racing Ltd., Clarence, NY (US)

( * ) Notice: Subject to any disclaimer, the term of this patent is extended or adjusted under 35 U.S.C. 154(b) by 384 days.

(21) Appl. No.: 12/410,955

(22) Filed: Mar. 25, 2009

(65) Prior Publication Data

US 2009/0242720 A1     Oct. 1, 2009

Related U.S. Application Data

(60) Provisional application No. 61/070,987, filed on Mar. 27, 2008.

(51) Int. Cl.
F16M 13/00 (2006.01)
E04G 25/00 (2006.01)

(52) U.S. Cl. .................................. 248/352; 254/133 R

(58) Field of Classification Search ................ 269/900; 254/352, 418, 424, 133 R; 248/121, 122.1, 248/125.1, 125.3, 352, 354.5; 33/203, 203.15, 33/203.18
See application file for complete search history.

(56) References Cited

U.S. PATENT DOCUMENTS

| | | | |
|---|---|---|---|
| 1,640,293 A | 8/1927 | Pitt | |
| 2,546,909 A * | 3/1951 | Slaymaker | 254/133 R |
| 3,891,177 A * | 6/1975 | Jerrel | 248/352 |
| 3,933,372 A | 1/1976 | Herndon | |
| 4,540,147 A * | 9/1985 | Lincourt | 248/352 |
| 4,811,924 A | 3/1989 | Walters | |
| 4,836,739 A | 6/1989 | Cappelletto et al. | |
| 5,054,805 A * | 10/1991 | Hungerink et al. | 280/475 |
| 5,180,177 A | 1/1993 | Maki | |
| 5,471,754 A * | 12/1995 | Mieling | 33/203.18 |
| 5,619,800 A * | 4/1997 | Unruh | 33/203.15 |
| 5,815,257 A * | 9/1998 | Haas | 356/155 |
| 5,842,281 A * | 12/1998 | Mieling | 33/203.18 |
| 6,142,488 A | 11/2000 | Orr | |
| 6,764,083 B2 * | 7/2004 | Bernard | 280/30 |
| 7,478,482 B1 * | 1/2009 | Pellegrino | 33/203.18 |
| 2006/0060745 A1 | 3/2006 | Nichols | |
| 2007/0102598 A1 | 5/2007 | Nichols | |

* cited by examiner

Primary Examiner — David B Thomas
(74) Attorney, Agent, or Firm — Phillips Lytle LLP

(57) ABSTRACT

An improved vehicle support apparatus, also referred to as a hub stand, for use with a vehicle. Certain aspects of the invention include a vertically disposed plate-like body or hub plate (20) which is adapted to receive a vehicle hub. In one embodiment, the plate-like body defines a plurality of openings (e.g. 21, 22) adapted to receive a vehicle hub and/or hub bolt. In certain aspects, the plate-like body is vertically adjustable and/or slidably received between clamp members. In another aspect, the plate-like body has openings adapted to receive pins, rods or bolts, and a clamp member has corresponding openings adapted to receive pins, rods or bolts, whereby the hub plate may be adjusted vertically relative to a vehicle.

13 Claims, 9 Drawing Sheets

VEHICLE SUPPORT APPARATUS

PRIORITY CLAIM

The present application claims priority to Provisional Patent Application No. 61/070,987, filed Mar. 27, 2008.

TECHNICAL FIELD

The present invention relates generally to a vehicle support apparatus and, more specifically, to an apparatus which supports automobiles and other vehicles at their hubs.

BACKGROUND OF THE INVENTION

Variations of a typical car jack or "jack stand" are available in the marketplace, but they are not designed to support a vehicle by its hubs. Vehicle support devices which do not attach to a vehicle's hub cannot be used for taking certain measurements and making certain adjustments. Because they do not attach to hubs, they do not compress a vehicle's suspension into a static, loaded configuration and, therefore, do not allow for measurement of suspension settings with the wheels removed.

Known devices which support a vehicle by its hubs are limited to gross height adjustments at a few select heights. Such a device, among other things, cannot emulate nor accurately reflect unique suspension geometry characteristics or facilitate specific measurements necessary in racing applications, for example.

Amateur racers and track personnel, for example, may wish to make their own ride-height, camber, caster, toe and corner weight adjustments, but do not have, or have access to, an automobile lift or suspension rack. Typically, these adjustments and settings need to be measured with the suspension in a compressed, static load state, i.e. sitting on wheels/tires with the suspension carrying the weight of the vehicle. For cars with full fenders, these adjustments typically are done with the wheels on the vehicle only if a professional suspension alignment rack is used. With access to such a lift or an alignment rack, many of the adjustments are made from underneath the car with the suspension load released. Without access to an alignment rack, these adjustments are done separately with the wheels removed and the suspension load released for each and every individual adjustment for each and every measurement category at each of the vehicle's four hubs. Four measurements/adjustments which are often taken/made (for each of a vehicle's wheels) are: ride height, camber, caster, toe and corner weight. With multiple adjustments and measurements required for each alignment category at each wheel, the continual measurement, wheel removal, adjustment, wheel replacement, re-measurement, removal, re-adjustment, replacement, re-measurement process is extremely time consuming and tiring. There is a need, therefore, for an improved vehicle support assembly which supports vehicles at their hubs and an improved vehicle support assembly which allows suspension adjustments and measurements without wheels and tires in the way.

BRIEF SUMMARY OF THE INVENTION

With parenthetical reference to the corresponding parts, portions or surfaces of the disclosed embodiment, merely for purposes of illustration and not by way of limitation, the present invention provides an improved vehicle support apparatus (10) with an adjustable hub plate (20) which is connected or attached to one or more of a vehicle's hubs. In one aspect, the hub plate is configured so as to allow a vehicle's hub bolts to extend through corresponding openings (22A, 22B, 22C, 22D, 22E) in the hub plate. In another aspect, the hub plate is secured with the vehicle's lug nuts. In another aspect, the hub stand is configured and arranged such that a vehicle suspension is maintained in a compressed load state to allow measurements and adjustments such as ride height, camber, caster, toe and corner weight.

One aspect of the invention comprises an apparatus for supporting a vehicle with a plurality of hubs and hub bolts, comprising a vertically disposed, substantially plate-like body with an opening adapted to receive the end portion (e.g spindle, axle shaft, bearing cap or cover, etc.) of a hub, and additional openings outside the circumference of the hub end portion opening adapted to receive/engage hub bolts. In another aspect of the invention, the plate-like body is slidably received between clamp members to allow for vertical adjustment. In yet another aspect, openings in the plate-like body and clamp members are adapted/defined to accept a pin member (e.g pin, rod, bolt etc.) to maintain the plate-like body at a desired vertical height or position relative to a vehicle. Other aspects include a resilient pad beneath the plate-like body and/or clamp members, and a base member generally perpendicular to the plate-like body. Yet another aspect includes a toe bar assembly which, among other things, acts as a horizontal extension of the surface of the plate-like body or hub plate.

In another aspect, the invention provides an apparatus for supporting a vehicle with a vertically disposed, substantially plate-like body and clamp members adapted to the urge against planar surfaces of the plate-like body, whereby the plate-like body is slidably received between the clamp members for vertical adjustment. In another aspect, pin openings in the plate-like body and pin openings in one or more clamp members may be aligned at a plurality of positions to allow the plate-like body to be fixed at a desired vertical position relative to a vehicle. In addition, another aspect of the invention provides a system for supporting a vehicle in a compressed load state comprising a plurality of vertically adjustable, substantially plate-like bodies, each having an opening adapted to receive a vehicle's hub end portion, wherein the vehicle remains in a compressed load state when hub end portions are received in such openings.

By using a suspension compensating hub stand in place of the wheels at each corner, the alignment measurement and adjustment process may be quicker and easier because easy access is available to all of the adjustment mechanisms with or without the suspension loaded and compressed, and there are no wheels or tires in the way.

The general object of the invention is to support a vehicle, such as an automobile or racecar, at its hubs. Another object is to provide an improved vehicle support apparatus which allows for various measurements and adjustments. Another object is to allow for the accurate measurement and adjustment of a vehicle's suspension components and characteristics while safely supporting the vehicle when the wheels and tires are removed. Yet another object is to allow for measurements and adjustments while suspension components are in a normal, static compressed mode, as if the wheels and tires were in place. Another object is to provide amateurs and professionals with a vehicle support assembly which may be used at the racetrack and at their own homes or facilities.

These and other objects and advantages will become apparent from the foregoing and ongoing written specification and the accompanying drawings.

DESCRIPTION OF THE PREFERRED EMBODIMENTS

Figure 1:
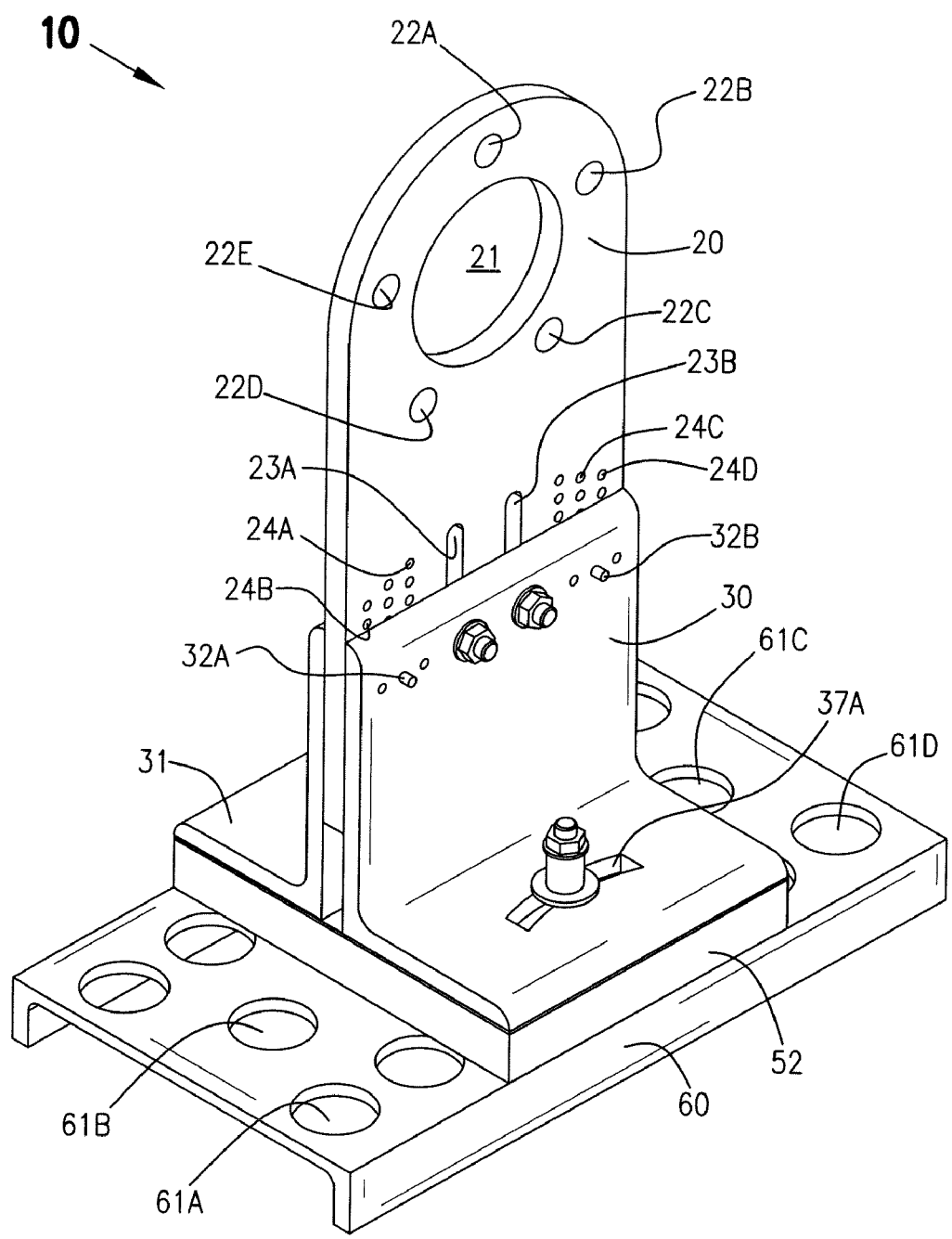
FIG. 1 is a perspective view of a vehicle support apparatus in accordance with one embodiment of the present invention.

At the outset, it should be clearly understood that like reference numerals are intended to identify the same parts, elements or portions consistently throughout the several drawing figures, as such parts, elements or portions may be further described or explained by the entire written specification, of which this detailed description is an integral part. The following description of the preferred embodiments of the present invention are exemplary in nature and are not intended to restrict the scope of the present invention, the manner in which the various aspects of the invention may be implemented, or their applications or uses.

In a preferred embodiment, the hub stand 10 is lightweight, adjustable mechanical device that bolts to one or more of a vehicle's 70 hub assemblies 71A, 71B, 71C, 71D, supporting the vehicle's weight while compensating for the unique height, camber and toe characteristics of the individual hub and suspension assembly that it is attached to. Because the hub stand 10 replaces one or more wheels and tires in supporting the vehicle, all of the suspension components that are normally hidden by the wheels and tires are now accessible for adjustment, yet can still be measured in their compressed, static loaded state. When attached in place of wheels and tires, the preferred embodiment allows free access to the vehicle's suspension components and adjustments. Because the hub stand 10 in the preferred embodiment is adjustable, differing wheel/tire heights can be compensated for. Further, because the preferred embodiment has a designed in capacity for flexibility, any camber or offset from vertical in the individual hub (and its corresponding wheel and tire) may be accurately replicated in the attached hub stand.

In a preferred embodiment, all four corners of a vehicle's ride height, camber, caster, toe, and, if on a set of scales, corner weighting can be measured in a compressed, static loaded state and then adjusted without ever having to put the wheels and tires back on until all adjustments and measurements have been completed. In addition, certain embodiments replicate or mimic the inherent toe deviation at each wheel.

Referring now to the drawings, and first, particularly, to FIG. 1 thereof, the preferred embodiment is comprised of a channel-shaped base plate 60; a camber compensating compression pad 52 beneath a low friction slip plate 50; and two extruded angle clamp members 30, 31 supporting a vertical hub carrier plate 20 generally perpendicular to top surface of the base plate. In this embodiment, the base plate 60, angle clamp members 30, 31 and hub carrier plate 20 are made from aluminum, but such parts may be made from other suitable materials. The compression pad 52 in this embodiment is made of neoprene, but may be made from other synthetic rubbers or suitable materials; and the slip plate is made from polyethylene such as UHMWPE (ultra high molecular weight polyethylene), high-modulus polyethylene (HMPE) or high-performance polyethylene (HPPE), but may be made from other suitable thermoplastics and other materials. The two angle clamp sections 30, 31 face each other as illustrated and slidably secure the hub carrier plate 20 between them. Immediately under the angle clamp sections in this embodiment are the slip plate 50 and compression pad 52. An additional slip plate also may be inserted/attached beneath the compression pad 52. The two angle clamp sections are bolted to the base plate 60 through slots 37A, 37B (which may be arcuate in shape) in the respective base portions of the angle clamp members and openings or holes in the base plate 61B, slip plate 51A, 51B and compression pad 52B. The relatively thin slip plate 50 is located between the compression pad 52 and the angle clamps. Cylindrical compression sleeves 39A, 39B encase corresponding bolts 33A, 33B which extend up from the base plate through openings in the slip plate 51 A, 51 B, openings in the compression pad 61B, and the slots 37A, 37B in the angle clamps. The angle clamp members and hub plate in this embodiment can roll vertically over the compression pad reflecting camber in the attached suspension. Also, the radial slots 37A, 37B in the angle clamp bases allow for a limited range of horizontal rotation in the angle clamps and hub plate. The hub plate is height adjustable through channels 23A, 23B in the hub plate which are secured by nuts 36A, 36B (see FIG. 6, for example), washers 37B and bolts 35A, 35B.

As illustrated in FIGS. 1, 2, 3 and 6, the base plate 60 in this embodiment includes a plurality of round openings 61A, 61B, 61C, 61D in the top surface of the base plate. Other embodiments include no such openings, openings of different shapes and/or different numbers of openings, for example.

In this embodiment, the hub plate 20 is a plate-like body which is generally elongated. The bottom portion of the hub plate in this embodiment is in the shape of a rectangle (three sides of a rectangle), and the top portion of the hub plate 20 is generally semi-circular. The upper portion of the hub plate defines a round or circular opening 21 surrounded by additional openings 22A, 22B, 22C, 22D, 22E which correspond to the bolts on a vehicle's hub. The hub plate 20 is attached or connected to a desired vehicle hub by extending the vehicle's wheel bolts through such openings 22A, 22B, 22C, 22D, 22E. The vehicle's lug nuts may be used to secure the hub stand. The hub plate may be adapted to align with and accept bolt patterns of various manufacturers, e.g. Porsche, Mustang, BMW, Corvette, Mazda, etc. and may correspond to a 4-bolt or 5-bolt (illustrated) patterns 22A, 22B, 22C, 22D, 22E, or other bolt patterns. Opening 21 is configured so as to allow a portion of the wheel hub assembly, hub/axle nut and/or cover to extend therethrough. As known to those skilled in the art, the end portion (which the opening 21 is adapted to receive)

may include a bearing cap or cover, or a portion of a spindle or axle shaft. Any such assembly, nut, cover, cap, spindle, shaft, portion or component is referred to herein as an "end portion" or "hub end portion".

The elongated channels 23A, 23B in the hub plate are used to adjust the height of the hub plate 20 in association with threaded bolts 35A, 35B and a plurality of openings or pin holes 24A, 24B, 24C, 24D, 24E, 24F in the hub plate and corresponding openings or pin holes 33A, 33B, 33C, 33D in angle clamp members 30, 31. Rods or pins 32A, 32B are inserted through desired pin holes in the angle clamp members 33A, 33B, 33C, 33D and hub plate 24A, 24B, 24C, 24D, 24E, 24F to provide the desired height. In another embodiment, the hub plate does not include such elongated channels, as in the embodiment discussed below with respect to FIGS. 11-15.

Figure 2:
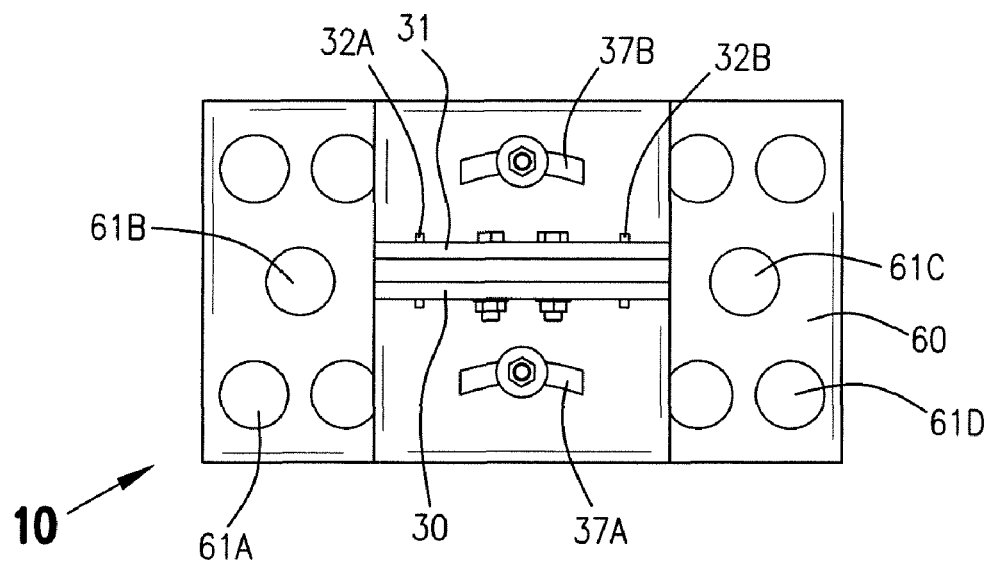
FIG. 2 is a top view of a vehicle support apparatus in accordance with one embodiment of the present invention.
Figure 3:
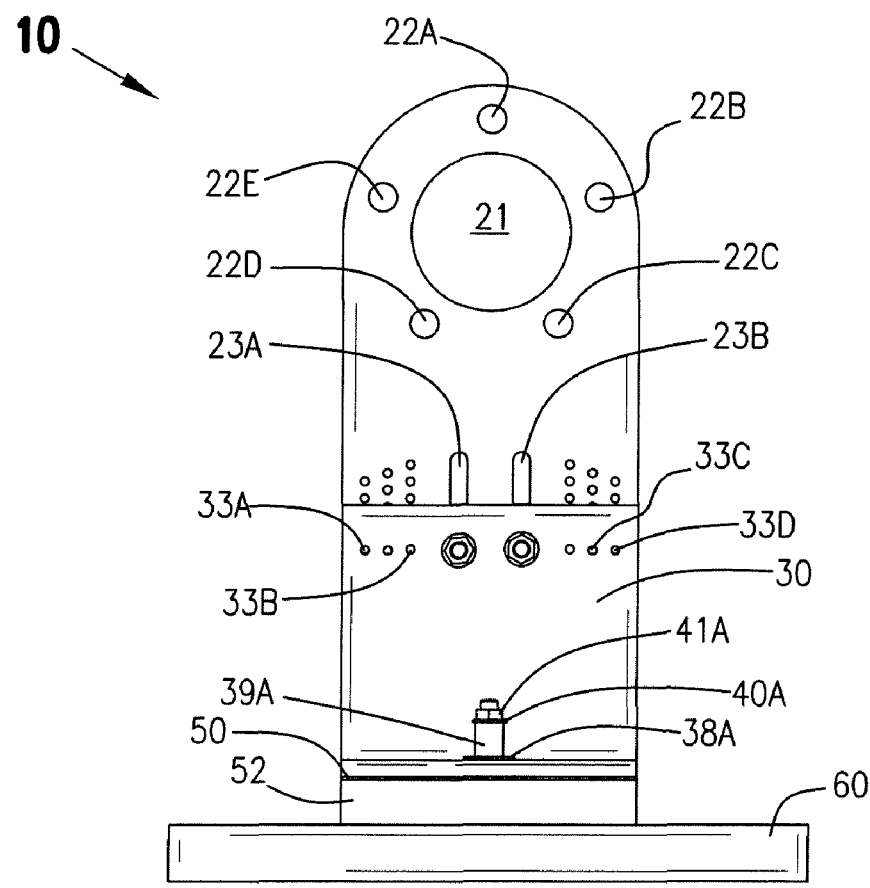
FIG. 3 is a front view of a vehicle support apparatus in accordance with one embodiment of the present invention.
Figure 4:
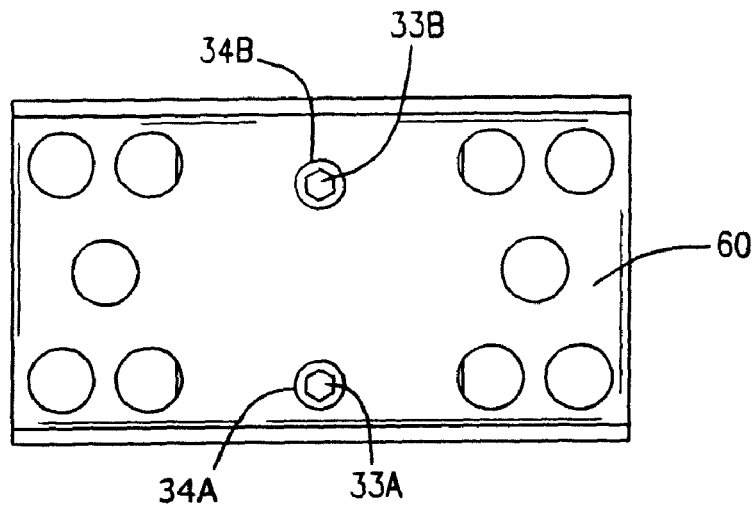
FIG. 4 is a bottom view of a vehicle support apparatus in accordance with one embodiment of the present invention.
Figure 5:
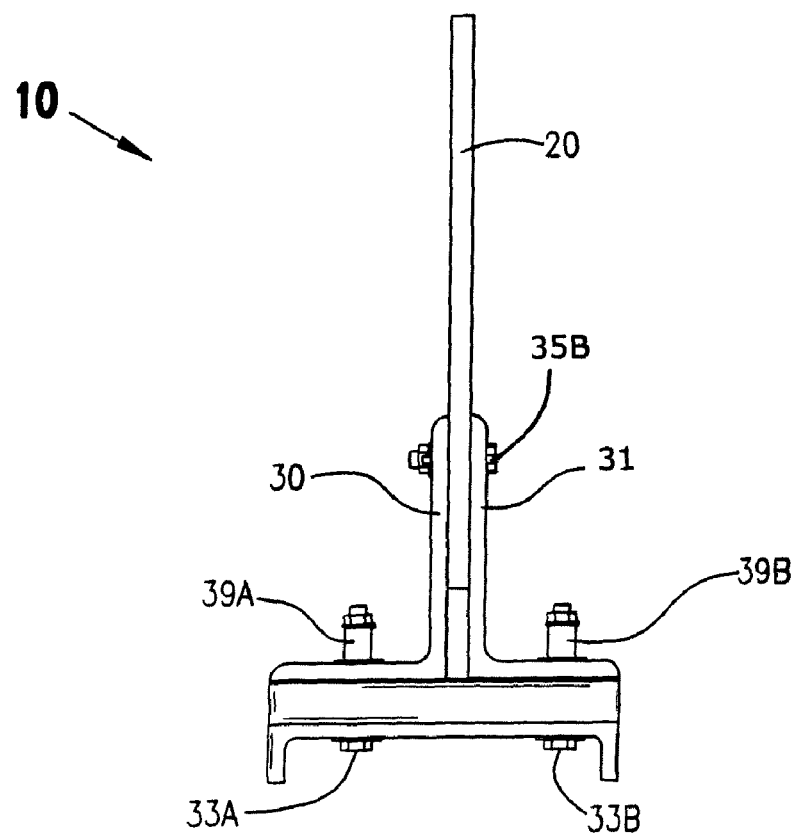
FIG. 5 is a side view of a vehicle support apparatus in accordance with one embodiment of the present invention.
Figure 6:
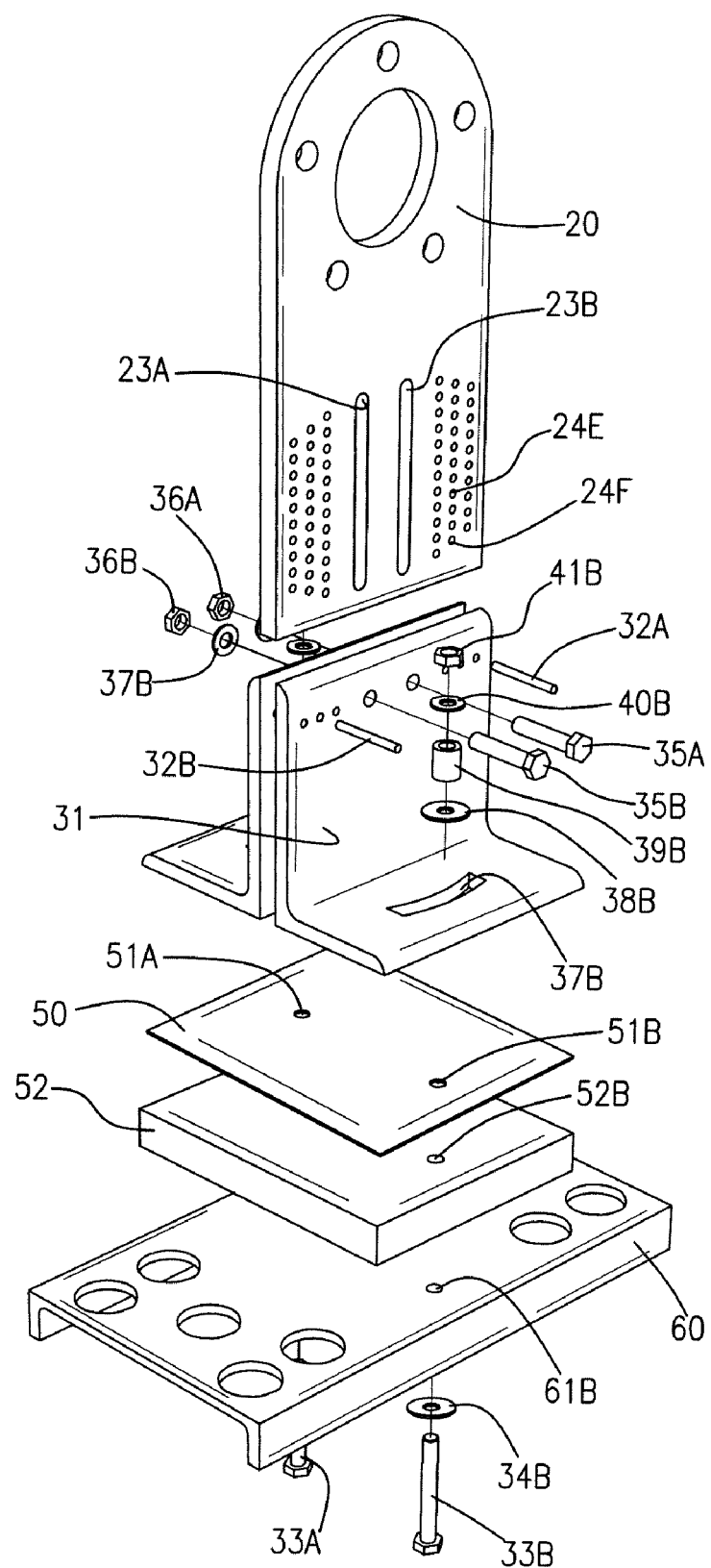
FIG. 6 is a an exploded view of a vehicle support apparatus in accordance with one embodiment of the present invention.
Figure 7:
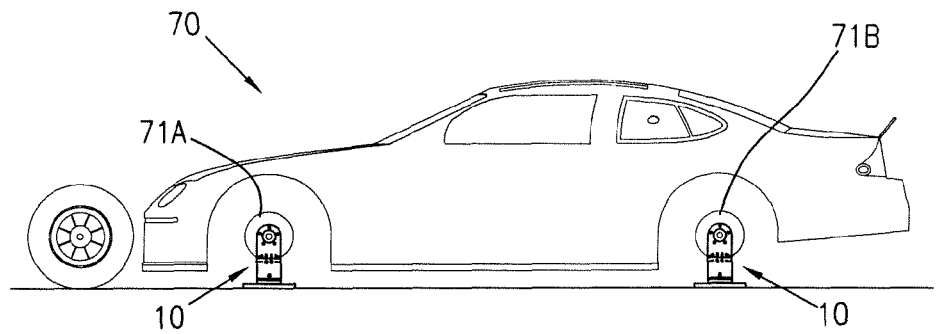
FIG. 7 is a diagram showing the use of a vehicle support apparatus in accordance with one embodiment of the present invention with an automobile.
Figure 8:
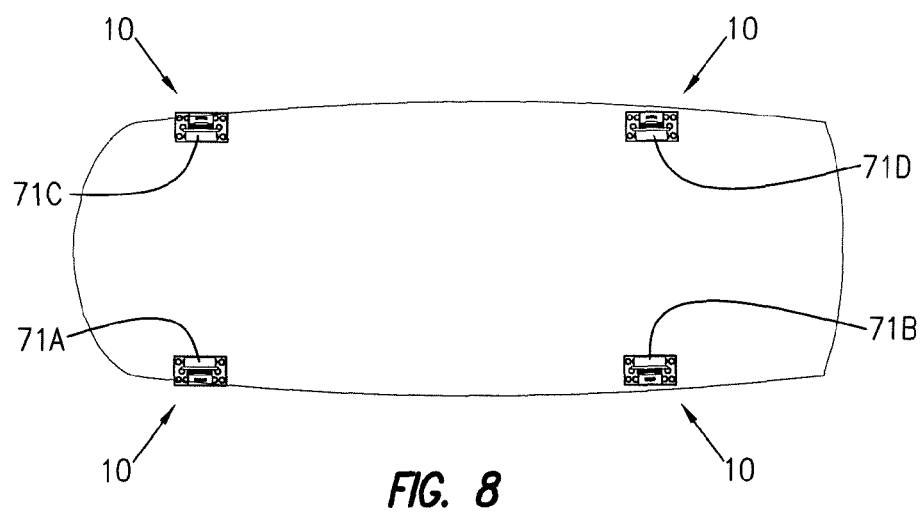
FIG. 8 is a top view of the diagram illustrated in FIG. 7.
Figures 9, 10:
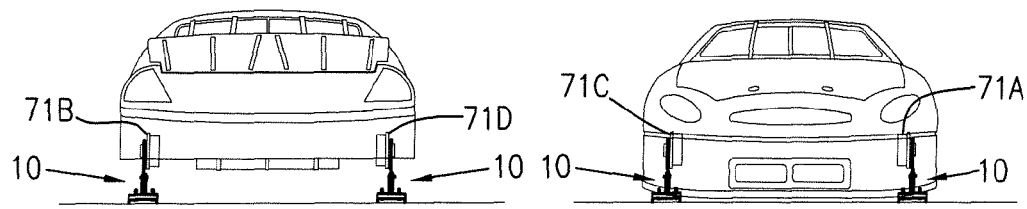
FIG. 9 is a rear view of the diagram illustrated in FIG. 7.
FIG. 10 is a front view of the diagram illustrated in FIG. 7.

Referring now to FIG. 2, a top view of the embodiment illustrated in FIG. 1 is shown. This view shows a second slot 37B in the second angle clamp member 31. In addition, FIG. 2 illustrates the extension of pins 32A, 32B through the pin holes in the angle clamps 30, 31 and hub plate. FIG. 3 is a front view of the hub stand 10 illustrated in FIG. 1. This drawing illustrates the relative vertical orientation of the base plate 60, compression pad 52, slip plate 50, front angle clamp member 30 and hub plate 20, among other things. In addition, FIG. 3 illustrates the compression sleeve 39A, washers 38A, 40A and nut 41A associated with bolt 33A. FIG. 4 is a bottom view of the embodiment illustrated in FIG. 1, which also illustrates washers 34A, 34B associated with the above described bolts 33A, 33B. FIG. 5 is a side view of a preferred embodiment of the hub stand. FIG. 5 illustrates the use of bolts 33A, 33B to secure the angle clamps to the base plate and one of the bolts 35B used to slidably secure the hub plate 20 to the angle clamps. FIG. 6 is an exploded view of the embodiment illustrated in FIG. 1 which illustrates, among other things, the openings in the slip plate 51A, 51B, compression pad 52B and base plate 61B through which the lower bolts 33A, 33B extend. FIG. 6 also illustrates the washers 38B, 40B and nut 41B associated with bolt 33B.

FIGS. 7-10 illustrate use of a preferred embodiment of the hub stand 10 with an automobile 70. The four hub assemblies 71A, 71B, 71C, 71D of the automobile 70 are connected to four hub stands 10 in the manner described above, i.e., the wheel bolts extend through corresponding openings 22A, 22B, 22C, 22D, 22E and the end portion of the wheel hub extends through a central opening 21.

Use of this embodiment first requires an adjustment to replicate the center heights of the vehicle's individual wheel/tire package. The adjusted units are then bolted to the hub in place of the vehicle's wheels and tires. In this way, the relative ride height at each measured corner is unchanged and can be accurately adjusted as desired. Because there is a rubber isolation and flexibility component built into the preferred embodiment, any camber that is set in the vehicle's suspension will not be affected by the hub stand, it will be replicated. Because of the flex components, camber adjustments can be made and accurately measured at each hub. Similarly, because the upper portion of the stands can rotate around the base unit, caster, toe-in and toe-out changes are also easily accomplished by each unit.

Figure 11:
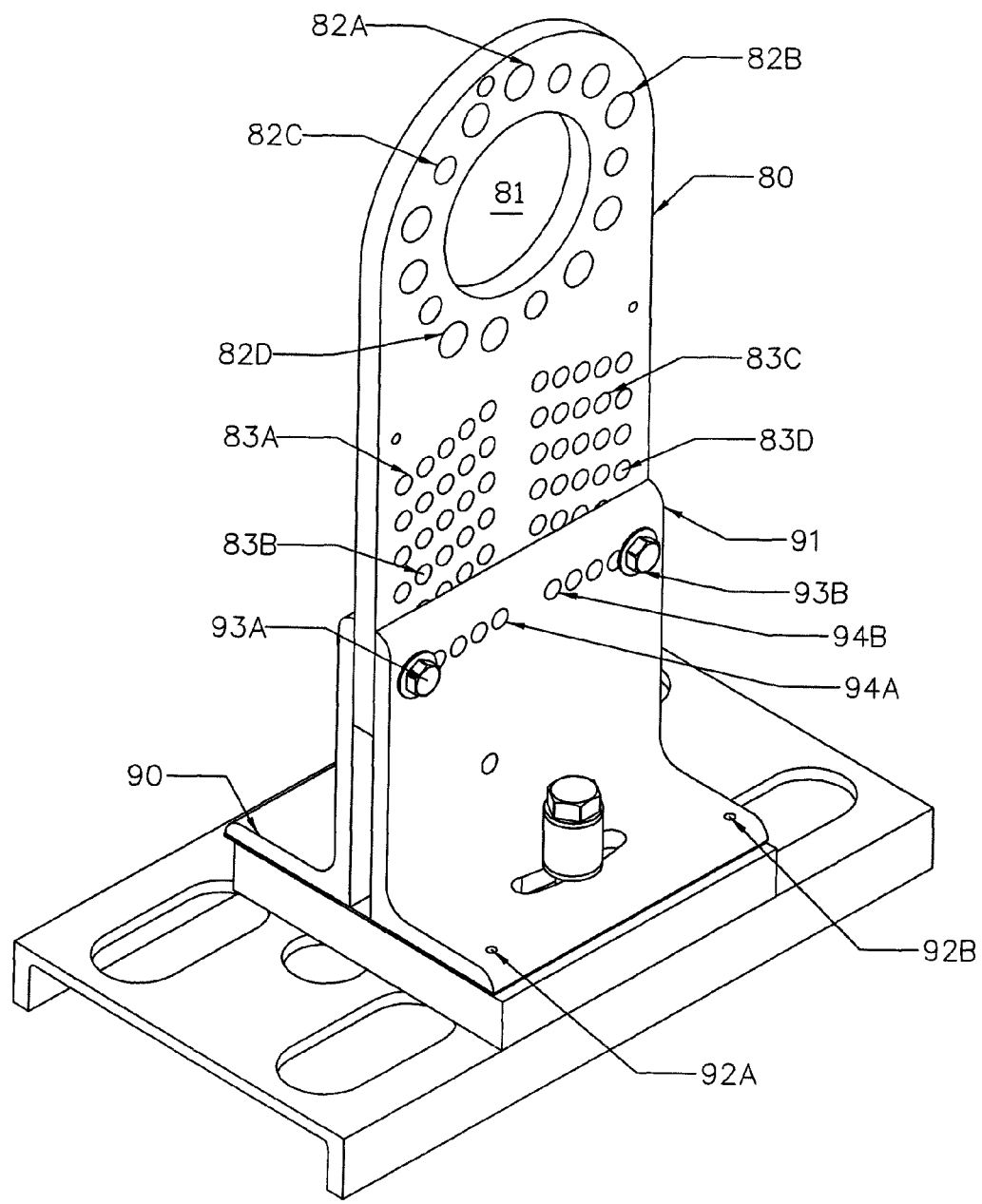
FIG. 11 is a perspective view of a vehicle support apparatus in accordance with one embodiment of the present invention.

FIG. 11 illustrates another preferred embodiment of the invention. In this embodiment, threaded clamp bolts 93A, 93B are inserted into one or more openings or holes e.g. 94A, 94B in a clamp member 91 (and/or clamp member 90) and through corresponding opening(s) or hole(s) e.g 83A, 83B, 83C, 83D in the hub plate 80. In this embodiment, threaded bolts are used to adjust height and carry the weight/shear loads associated with the vehicle (and pins or rods of sufficient strength may also be used, for example). Also, in the embodiment illustrated in FIGS. 11 and 13, the hub plate 80 defines several openings or holes e.g 82A, 82B, 82C, 82D for hub bolts to accommodate various vehicle/wheel/hub types, in addition to an opening 81 for a hub end portion.

Figure 12:
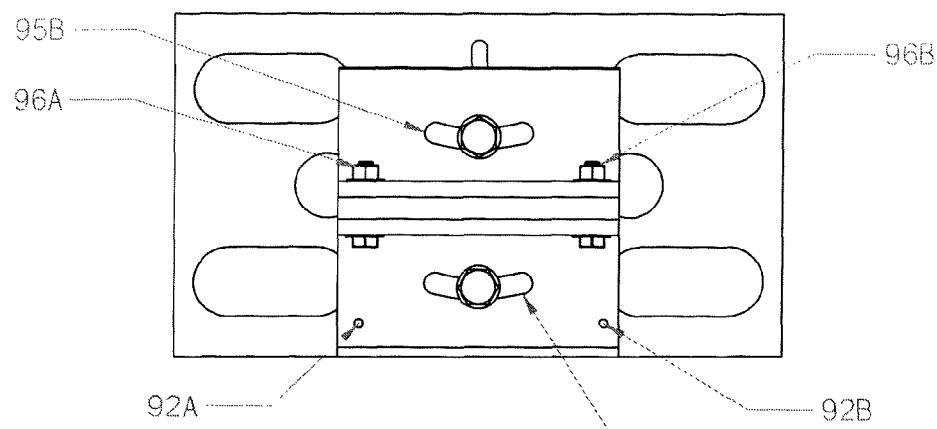
FIG. 12 is a top view of a vehicle support apparatus in accordance with one embodiment of the present invention.
Figure 13:
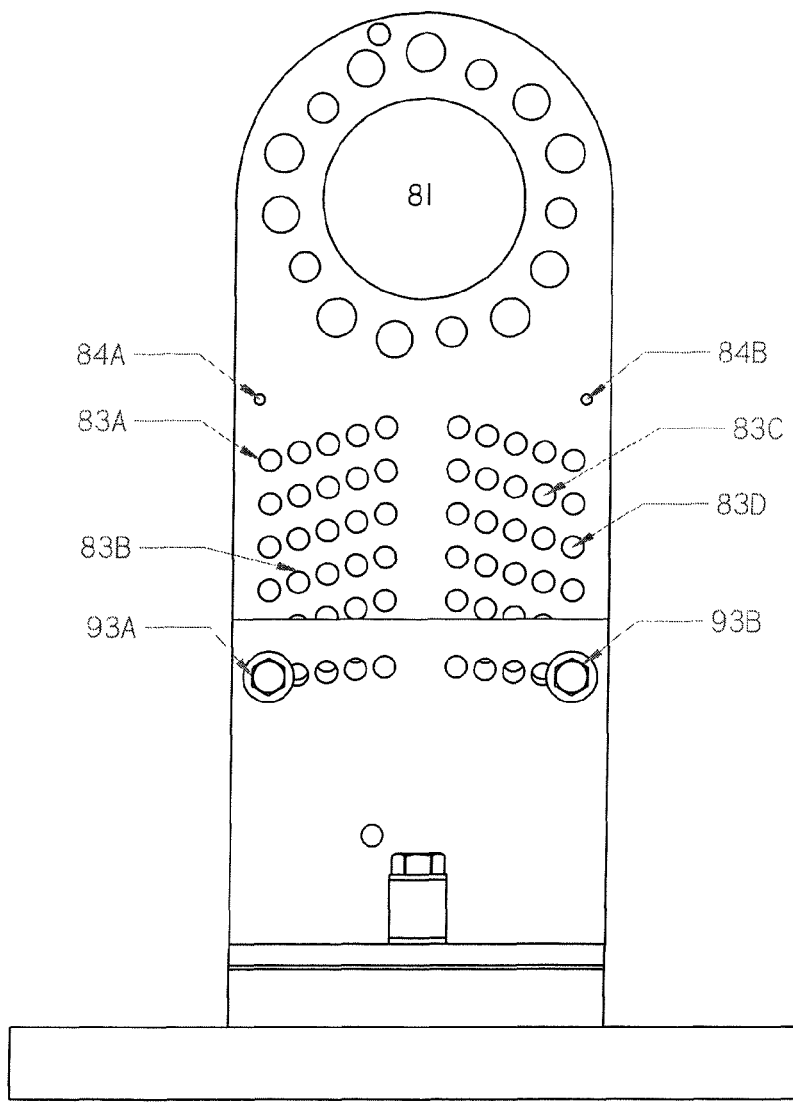
FIG. 13 is a side view of a vehicle support apparatus in accordance with one embodiment of the present invention.

FIG. 12 is a top view of the embodiment illustrated in FIG. 11, which further illustrates nuts 96A, 96B attached to the threaded clamp bolts and slots in the angle clamps. FIG. 13 is a front view of the same embodiment.

Figure 14:
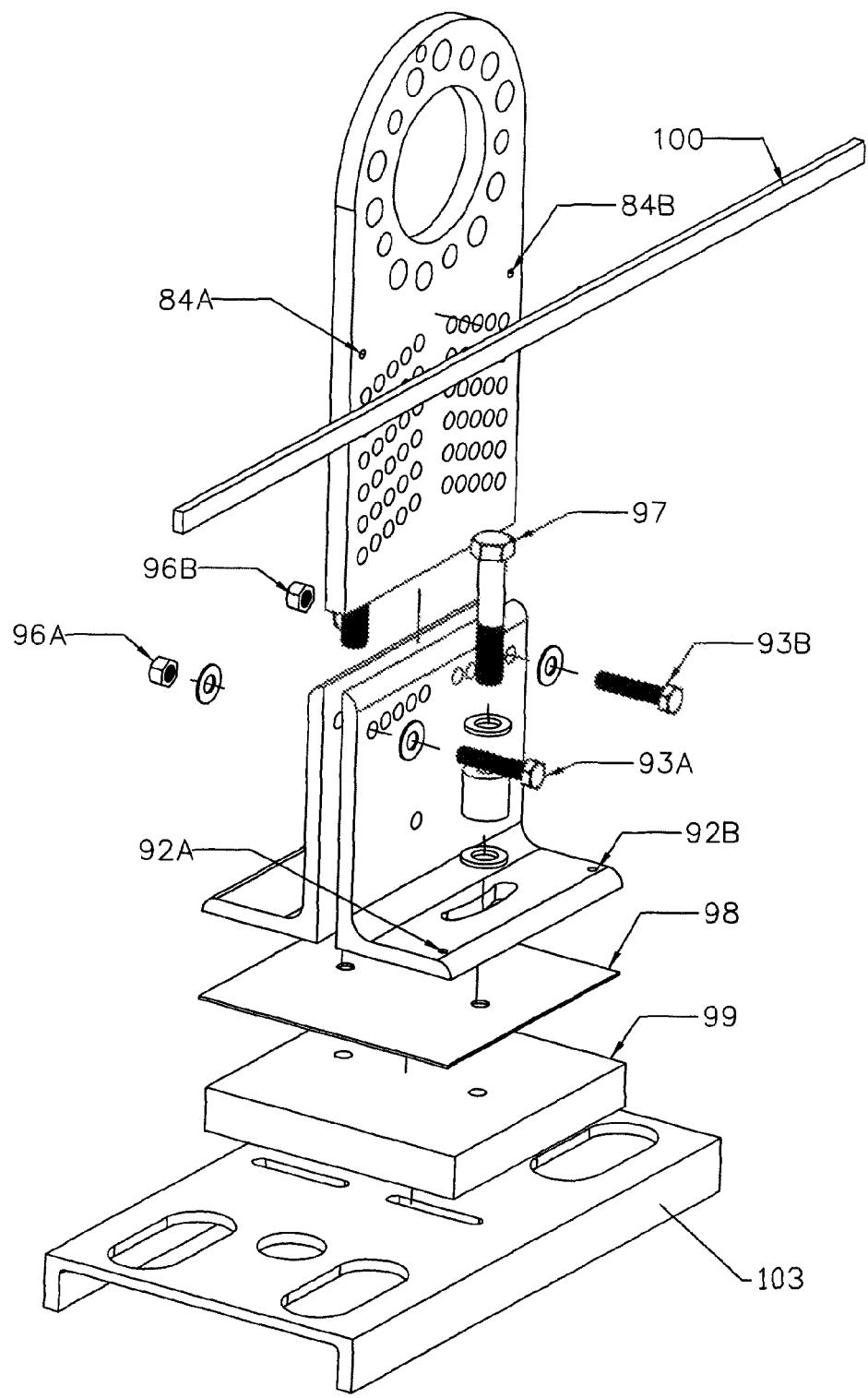
FIG. 14 is an exploded view of a vehicle support apparatus in accordance with one embodiment of the present invention, including a toe bar assembly.
Figure 15:
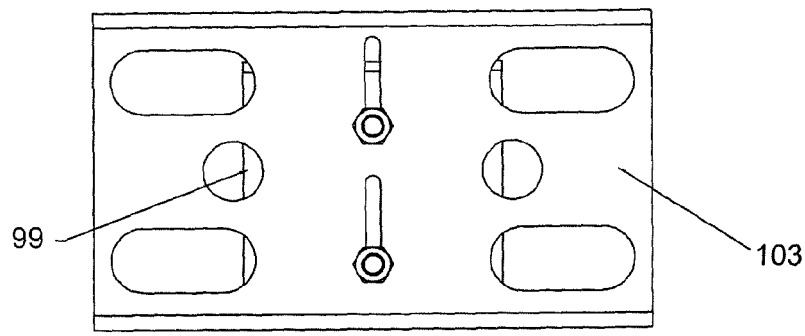
FIG. 15 is a bottom view of a vehicle support apparatus in accordance with one embodiment of the present invention.
Figure 16:
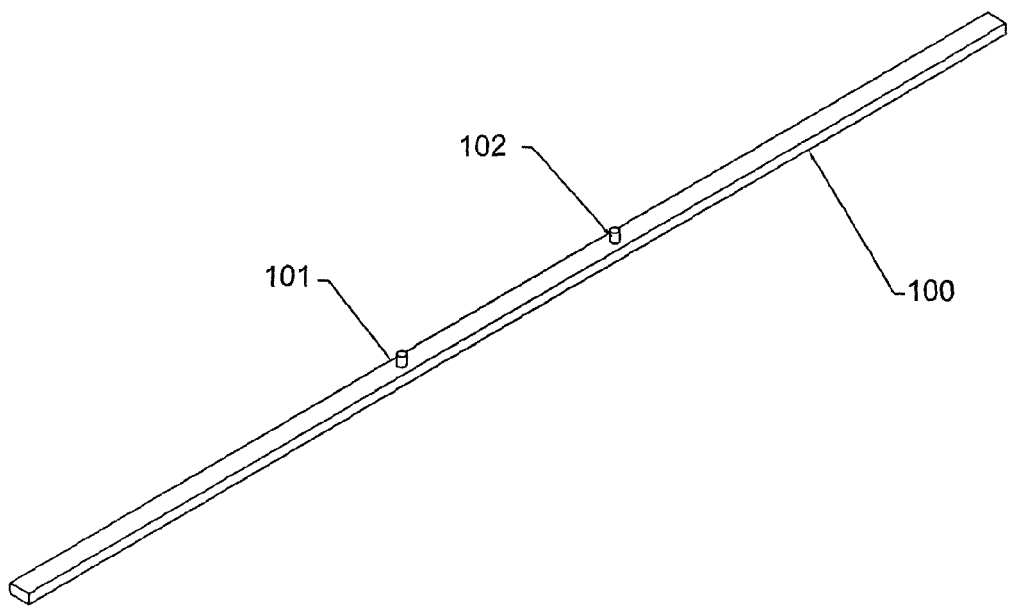
FIG. 16 is a perspective view of a toe bar in accordance with one embodiment of the present invention.

The embodiment illustrated in FIGS. 14 and 16 includes a toe bar assembly wherein the toe bar 100 is a straight edge attached to either the hub plate or an angle clamp member. The toe bar 100 may be made of aluminum or other suitable material. In one aspect, the toe bar acts as a surrogate for the plane of the hub/wheel/tire assembly and makes measurement of the position of a hub relative to another hub easier and more accurate; or, in another aspect in conjunction with a set-up "string," more accurate relative to a vehicle's centerline. In the embodiment shown in FIG. 16, two extensions or protrusions (e.g. metal dowels or dowel pins) 101, 102 extending from the back surface of the toe bar 100 correspond to openings 84A, 84B, 92A, 92B in either the face of an angle clamp member 92A, 92B or the hub plate 84A, 84B. These openings are also illustrated in FIGS. 11 and 13. The extensions/protrusions may, therefore, be inserted into openings in the plate-like body or clamp to hold the toe bar in place for measurement, and quickly and easily removed when a user has finished measuring the toe. The two angle clamp sections in FIG. 14 are bolted to the base plate through slots (arcuate in shape in this embodiment) in the respective base portions of the angle clamp members and openings or holes in the base plate, slip plate 98 and compression pad 99. The relatively thin slip plate 98 is located between the compression pad 99 and the angle clamps. Bolts e.g. 97 extend through the base plate and through openings in the slip plate, openings in the compression pad, and the slots in the angle clamps. The base plate or base member 103 illustrated in the embodiments of FIGS. 11, 12, 13 and 14 includes openings of various shapes.

While there has been described what is believed to be the preferred embodiment of the present invention, those skilled in the art will recognize that other and further changes and modifications may be made thereto without departing from the spirit of the invention. Therefore, the invention is not limited to the specific details and representative embodiments shown and described herein. Accordingly, persons skilled in this art will readily appreciate that various additional changes and modifications may be made without departing from the spirit or scope of the invention, as defined and differentiated by the following claims. In addition, the terminology and phraseology used herein is for purposes of description and should not be regarded as limiting.

What is claimed is:

1. An apparatus for supporting a vehicle having a plurality of hubs and associated hub bolts, comprising:
   a vertically disposed, substantially plate-like body defining a first opening adapted to receive a hub end portion;
   said plate-like body further defining a second opening outside the circumference of said first opening, said second opening adapted to receive a hub bolt; and
   said plate-like body further defining a third opening outside the circumference of said first opening, said third opening adapted to receive a hub bolt;
   wherein at least one of said second opening and said third opening is not on the same vertical axis as said first opening;
   a first angle clamp member;

a second angle clamp member in substantial mirror image relation to said first angle clamp member;

wherein said plate-like body is slidably received between said first and second clamp members.

2. The apparatus of claim 1, further comprising a pin member;

wherein said plate-like body further defines a plurality of inner pin openings adapted to receive a pin member; and at least one of said first angle clamp member and said second angle clamp member defines a plurality of corresponding outer pin openings adapted to receive a pin member;

whereby said plate-like body and said angle clamp members may be maintained in a desired vertical relationship when said pin member is inserted through an inner pin opening and through a corresponding outer pin opening.

3. The apparatus of claim 2 wherein said inner pin openings and said outer pin openings may be aligned at a plurality of positions to allow the plate-like body to be fixed at a desired vertical position relative to a vehicle.

4. The apparatus of claim 1, further comprising a base member connected to said first and second angle clamp members, which base member is substantially perpendicular to said plate-like body.

5. The apparatus of claim 1, further comprising a resilient pad beneath said plate-like body.

6. The apparatus of claim 1 wherein said plate-like body further defines a third opening and a fourth opening outside the circumference of said first opening.

7. The apparatus of claim 1 wherein said plate-like body further defines a plurality of pin openings, and further comprising an elongated toe bar member having at least two extensions on a single surface of said toe bar, each of said extensions being adapted for insertion into one of said pin openings.

8. An apparatus for supporting a vehicle having a plurality of wheels and associated hubs and hub bolts, comprising:

a vertically disposed, substantially plate-like body defining an opening for supporting wheel at its hub, said plate-like body having a first vertically-oriented planar surface and a second vertically-oriented planar surface;

a first angle clamp member adapted to be urged against said first planar surface;

a second angle clamp member in substantial mirror image relation to said first angle clamp member, said second angle clamp member adapted to be urged against said second planar surface;

wherein said plate-like body is slidably received between said first angle clamp member and said second angle clamp member for vertical adjustment.

9. The apparatus of claim 8 wherein said plate-like body further defines a plurality of openings adapted to receive hub bolts.

10. The apparatus of claim 8 wherein said first angle clamp member defines a plurality of clamp member openings; and said plate-like body further defines a plurality of plate-like body openings; wherein said clamp member openings and said plate-like body openings may be aligned so as to receive a pin member through at least one of said aligned openings to fix the vertical position of the plate-like body relative to a vehicle.

11. The apparatus of claim 8, further comprising a resilient pad beneath said plate-like body.

12. An system for supporting in a compressed load state a vehicle having a plurality of hubs having hub end portions, comprising:

a plurality of vertically adjustable, substantially plate-like bodies, each defining an opening adapted to receive a hub end portion and each defining a vertical plane;

a plurality of first angle clamp members, each having an upper portion generally parallel to a corresponding vertical plane;

a plurality of second angle clamp members in substantial mirror image relationship to corresponding first angle clamp members, wherein said plate-like bodies are slidably received between corresponding first and second angle clamp members;

wherein a vehicle remains in a compressed load state when one or more hub end portions of said vehicle are received in said opening.

13. The system of claim 12, further comprising a vehicle having a plurality of hubs having hub end portions.

\* \* \* \* \*